United States Patent [19]

Luria

[11] 4,084,557

[45] Apr. 18, 1978

[54] PISTON-TYPE INTERNAL COMBUSTION ENGINE

[76] Inventor: David Luria, 81B University St., Tel Aviv, Israel

[21] Appl. No.: 683,704

[22] Filed: May 6, 1976

[30] Foreign Application Priority Data

Jul. 24, 1975 Israel ......................................... 47787

[51] Int. Cl.² .............................................. F01L 1/34
[52] U.S. Cl. ............................. 123/90.15; 123/90.17; 123/90.16
[58] Field of Search ............... 123/90.15, 90.17, 90.16, 123/20, 110, 97 B

[56] References Cited

U.S. PATENT DOCUMENTS

| 1,651,402 | 12/1927 | Mingley | 123/90.18 |
| 3,413,965 | 12/1968 | Gavasso | 123/90.16 |
| 4,033,304 | 7/1977 | Luria | 123/90.15 |

*Primary Examiner*—Charles J. Myhre
*Assistant Examiner*—R. A. Nelli
*Attorney, Agent, or Firm*—Benjamin J. Barish

[57] ABSTRACT

An internal combustion engine comprises a cylinder, a piston displaceable therein, a control member movable to control the engine output, means including an intake valve for effecting the induction of a fuel-air mixture into the cylinder, timing means including a main cam shaft having a cam for opening and closing the intake valve, and phase-shifting means including an auxiliary cam shaft having a cam shifting the phase of closing of the intake valve in response to the movement of the control member to thereby control the quantity of fuel-air mixture in the cylinder at the time of combustion.

12 Claims, 12 Drawing Figures

PISTON-TYPE INTERNAL COMBUSTION ENGINE

RELATED APPLICATIONS

The present application is related to my copending U.S. patent application Ser. No. 585,652, filed June 10, 1975.

BACKGROUND OF THE INVENTION

The present invention relates to piston-type internal combustion engines, and is directed to improvements in or modifications to the engine described in my above-cited copending U.S. patent application Ser. No. 585,652.

My above-cited U.S. Patent Application describes an internal combustion engine including a cylinder, a piston displaceable therein, means including an intake valve for effecting the induction of a fuel-air mixture into the cylinder, and a control member (e.g., accelerator pedal) movable to control the engine output, the engine being characterized in that it includes a variable valve timing device controlling the timing of the intake valve, and a coupling between the movable control member and the variable timing device which coupling varies the timing of the intake valve in response to the movement of the control member to thereby control the quantity of the fuel-air mixture in the cylinder at the time of combustion. In the preferred embodiment of the invention therein described, the variable timing device effects a delay in the closing of the intake valve after the start of the compression stroke, the delay being increased when the control member is moved to lower the engine output, and being decreased or eliminated when the control member is moved to raise the engine output. Thus, the greater is the delay, the greater is the quantity of charge pumped back into the intake manifold during the early part of the compression stroke, the smaller is the quantity of charge in the combustion chamber during the combustion process, and therefore the lower is the engine output.

The engine described in the above-cited patent application further includes an arrangement for maintaining a substantially constant atmospheric pressure at the beginning of the actual compression stroke when the intake valve closes, and a substantially constant pressure at the end of the actual compression stroke, notwithstanding variations in the time of closing the intake valve. The engine thus maintains a substantially constant compression ratio in each cylinder and a substantially constant pressure during the combustion process under all load conditions, the pressure within the cylinder at the end of the expansion stroke decreasing with a decrease in load, thereby maximizing combustion.

A further embodiment of the invention is therein described wherein the arrangement for maintaining a substantially constant compression ratio in each cylinder, therein called a main cylinder, comprises an auxiliary cylinder for each main cylinder, and an auxiliary piston movable in each auxiliary cylinder, the inner ends of the two cylinders communicating with each other and defining a common combustion chamber with their respective pistons, the auxiliary piston being displaceable within its cylinder to increase or decrease the volume of the common chamber.

An important characteristic of the engine described in the above patent application is that the engine produces a relatively longer expansion stroke for partial (i.e., less than maximum) loads than the real compression stroke. Thus, the engine operates according to the ideal Otto cycle only for maximum load, and according to or close to the Atkinson cycle for partial loads. Such an engine may therefore be referred to as having an "Otto-Atkinson" cycle, and as shown in the above-cited patent application, it is capable of producing more complete expansion and exhaust, without pumping losses, and thus has better thermal efficiency than the conventional Ott-cycle engine for under maximum load conditions.

BRIEF SUMMARY OF THE PRESENT INVENTION

An object of the present invention is to provide further improvements in the type of engine described in the above-cited patent application.

According to one aspect of the present invention, the engine includes timing means comprising a main cam shaft having a cam for opening and closing the intake valve, and phase-shifting means including an auxiliary cam shaft having a cam shifting the phase of closing of the intake valve in response to the movement of the control member to thereby control the quantity of fuel-air mixture in the cylinder at the time of combustion.

According to another aspect of the present invention, there is provided an internal combustion engine comprising: a main cylinder; a main piston displaceable therein; an auxiliary cylinder; an auxiliary piston displaceable therein; the inner ends of the main and auxiliary cylinders communicating with each other and defining a common combustion chamber with their respective pistons; means including an intake valve for effecting the induction of a fuel-air mixture into said common combustion chamber; and a spark plug carried by said auxiliary piston for igniting the fuel-air mixture in said chamber.

According to a further aspect of the present invention, the auxiliary piston includes a first section at one end defining a wall of the common combustion chamber, and a second section mechanically coupled to the first section and defining an expansible and contractable compartment with the opposite end of the auxiliary cylinder. The engine further includes means for supplying fluid to that compartment, and a relief valve within the compartment. The relief valve is preset to open at a predetermined high pressure thereby fixing the maximum pressure producible in the combustion chamber during steady-state high and low load conditions, the pressure within the combustion chamber at the beginning of the compression stroke also being substantially constant for high and low load conditions, whereby a substantially constant compression ratio is maintained under all load conditions.

An important advantage of the present invention is that it enables the advantageous features of my above-cited Patent Application to be more easily incorporated into a conventional piston-type internal combustion engine with substantially less design changes than would be required in that patent application. Thus, one of the aspects of the present invention enables the auxiliary cylinder to be incorporated into the engine by attaching same to the original opening already provided in the engine head for the conventional spark plug. In addition, the need for a complicated hydraulic system for controlling the timing of the intake valve is obviated by the provision of the auxiliary cam shaft which is driven with, and at the same angular velocity as, the main cam shaft but includes an arrangement wherein its phase is shifted in accordance with the load on the engine as controlled by the engine output control member, e.g., the accelerator pedal.

According to another aspect of the present invention, there is provided an arrangement for increasing engine braking, by providing a throttle connected to the engine braking system so that when the engine is braked the throttle is closed, thereby producing pumping losses and engine braking.

According to a still further aspect, the auxiliary cam shaft is used also to control the ignition timing.

Further aspects, features and advantages of the invention will be apparent from the description below.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
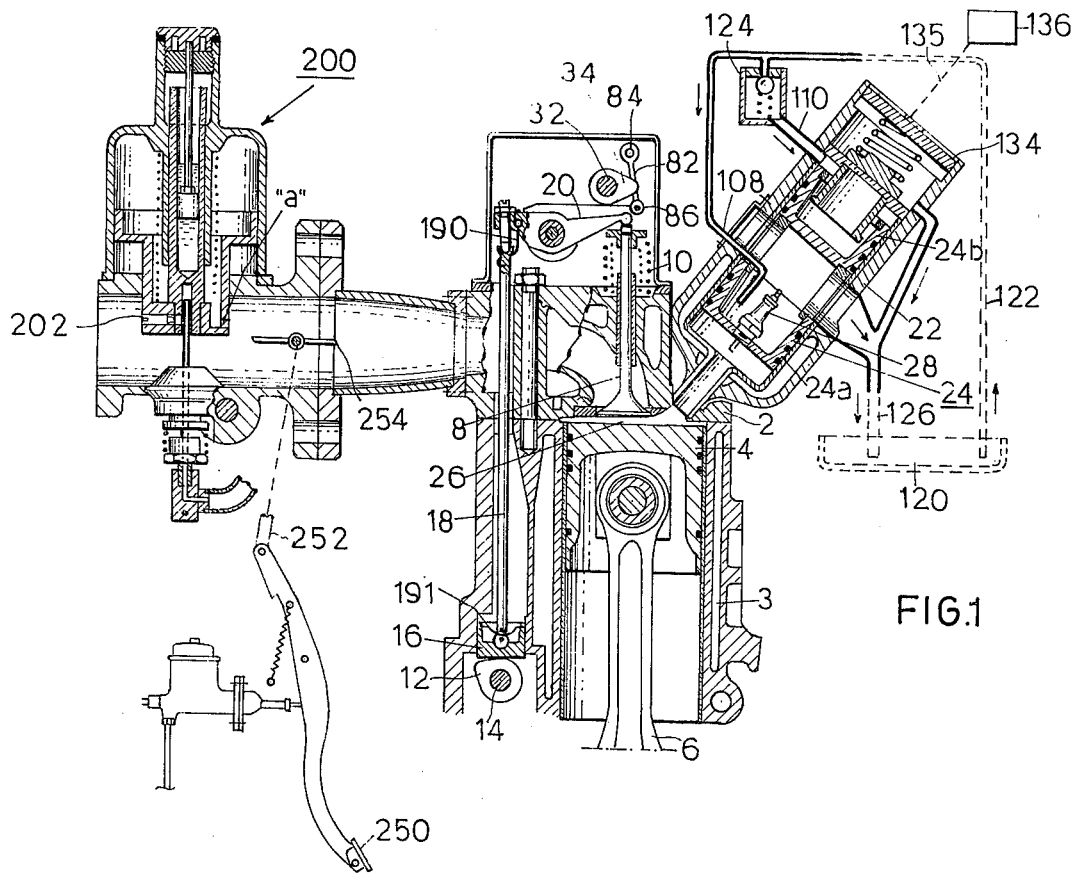
FIG. 1 illustrates a part of an engine, mainly a single main cylinder and its auxiliary cylinder, constructed in accordance with the present invention.

The engine illustrated in FIG. 1 includes an engine head 2, a main cylinder 3, a piston 4 displaceable therein, a connecting rod 6 connected to the piston, and an intake valve 8 for effecting the induction of a fuel-air mixture into the cylinder. Intake valve 8 is normally urged to its closed position by means of a spring 10, and is cyclically opened by a cam 12 carried on a cam shaft 14, the cam acting via a follower 16, a push rod 18, and a pivotably mounted rocker arm 20. The foregoing elements are substantially the same as in a conventional engine and are therefore not described herein in detail.

According to one aspect of the present invention, the opening (the original one, or after enlargement) in the engine head 2 normally provided for the engine spark plug is used in the described embodiment for mounting an auxiliary cylinder 22 having a two-section piston 24 displaceable therein. The inner end of auxiliary cylinder 22 communicates with the inner end of the main cylinder 3, such that the two cylinders, with their respective pistons 4 and 24, define a common combustion chamber 26. Intake valve 8 effects the induction of a fuel-air mixture into the common combustion chamber 26, and the mixture is ignited by a spark plug 28 carried by auxiliary piston 24 within auxiliary cylinder 22.

The opening of the intake valve 8 is controlled by cam 12 on the main cam shaft 14, but the closing of that valve is controlled not only by cam 12, but at times also by another cam 34 on an auxiliary cam shaft 32. Auxiliary cam shaft 32 is driven at the same angular velocity as the main cam shaft 14, but includes means for shifting its phase with respect to the main cam shaft in accordance with the movement of the engine output control member, i.e. the automobile accelerator pedal, such that a delay is interposed in the closing of the intake valve after the start of the compression stroke, the delay being increased when the control member is moved to lower the engine output, and being decreased or eliminated when the control member is moved to raise the engine output.

Figure 2:
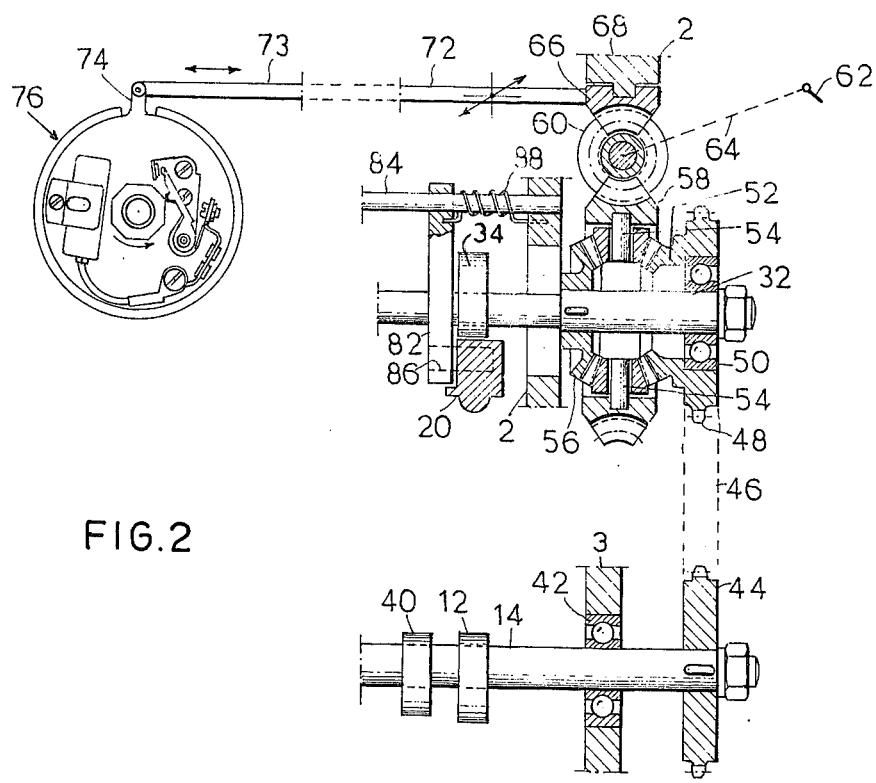
FIG. 2 illustrates the mechanism for controlling the phase of the auxiliary cam shaft, which controls the timing of the closing of the intake valve, in the engine of FIG. 1.

The arrangement for driving the auxiliary cam shaft 32 is shown more particularly in FIG. 2, which illustrates the main cam shaft 14 carrying cam 12 controlling the intake valve 8, and also carrying a cam 40 controlling the exhaust valve (not shown). The main cam shaft 14 is rotatable in a bearing 42 and is coupled to a sprocket 44. The latter is coupled, via chain 46, to another sprocket 48 rotatably mounted via bearing 50 on the auxiliary cam shaft 32.

Sprocket 48 has a gear face 52 which meshes with four gears 54 equally spaced around the circumference of gear 52. The four gears 54 in turn mesh with a gear 56 fixed to the auxiliary cam shaft 32. The four gears 54 are supported internally of a wheel 58 meshing with a worm 60. Worm 60 is coupled to the automobile accelerator pedal 62 via a mechanical coupling, shown schematically by broken lines 64, so as to be rotated, and thereby to rotate ring 58, upon the displacement of the accelerator pedal.

The arrangement is such that the auxiliary cam shaft 32 is rotated at the same angular velocity as the main cam shaft 14 by means of sprocket 44, chain 46, sprocket 48, gear 52, the four gears 54 meshing therewith, and gear 56 meshing with the latter gears and fixed to the auxiliary cam shaft 32. However, upon the displacement of the accelerator pedal 62, worm 60 is rotated, to thereby circumferentially displace wheel 58 and the four gears 54 carried thereby. This displacement of the four gears effects a phase shifting of gear 56 with respect to gear 52 according to the direction of displacement of ring 58. As briefly described above, and to be described more fully below, the phase of auxiliary cam shaft 32 is shifted with respect to the main cam shaft 14 such that cam 34 of the auxiliary cam shaft retards the closing of the intake valve 8 to a greater extent under light engine loads, when the accelerator pedal 62 is lightly depressed, the retarding in the closing of the intake valve being reduced the more the accelerator pedal is depressed, so that under full engine load conditions, the retarding is minimal or altogether eliminated whereby the engine performs according to the conventional Otto-cycle.

In the conventional engine, the ignition timing is normally controlled by the engine speed and by the vacuum in the manifold. In the arrangement described above included in the novel engine of the present invention, however, there is no substantial vacuum in the manifold, and therefore ignition timing is controlled by the accelerator pedal which controls the engine output.

For this purpose, worm 60 also meshes with a rack 66 which is moved (normal to the plane of the drawings in FIG. 2) by the rotation of the worm in accordance with the displacement of the accelerator pedal 62. This movement of rack 66 is guided by a rib 68 formed in the engine head 2 received within a slot formed in the rack. Rack 66 is coupled via a linkage including a member 72 movable normal to the plane of the paper of FIG. 2, and another member 73 movable leftwardly or rightwardly in the plane of FIG. 2, upon the displacement of the rack by worm 60. Linkage member 73 is connected to rod 74 of the ignition timing device 76 so as to control the ignition timing in response to the depression of the accelerator pedal 62. Thus while the closing of the intake valve 8 is retarded, the ignition is also retarded in direct proportion.

The manner in which cam 34 on the auxiliary cam shaft 32 influences the closing of the intake valve 8 can be seen from FIGS. 2, 4a–4c and 5a–5c.

Figure 4A:
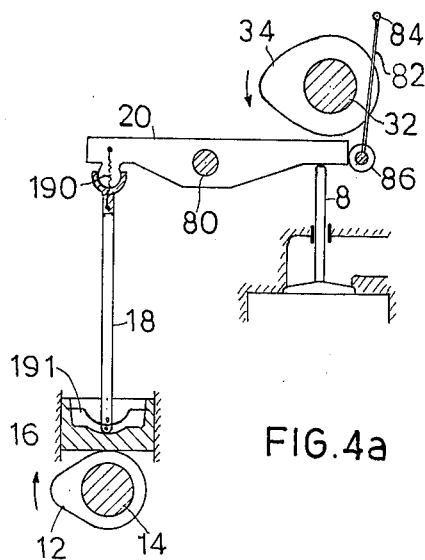
FIGS. 4a-4c illustrate the control of the intake valve under high load conditions.

As shown particularly in FIG. 2 and FIG. 4a, for example, rocker arm 20 is pivotably mounted at 80 so that one end of the rocker arm is actuatable by cam 12 on the main cam shaft 14 via follower 16, push rod 18, and the other end of rocker arm cooperates with cam 34 on the auxiliary cam shaft 32. A lever 82 is pivotably mounted to the engine head by means of a shaft 84, the opposite end of the lever carrying a roller stop 86 which is urged by coil spring 88 around shaft 84 against the end of rocker arm 20 (FIG. 2). When the intake valve 8 is closed, as shown for example in FIG. 4a, the stop 86 is spring-urged against the end of rocker arm 20, and as the rocker arm is pivoted so that end of the rocker arm descends below the stop, the stop is spring-urged to roll over the end of rocker arm 20 and to overlie its upper surface, as shown for example in FIG. 5b, where the stop will remain to prevent the return upward movement of the respective end of the rocker arm until the stop is removed by the auxiliary cam 34.

Figure 5A:
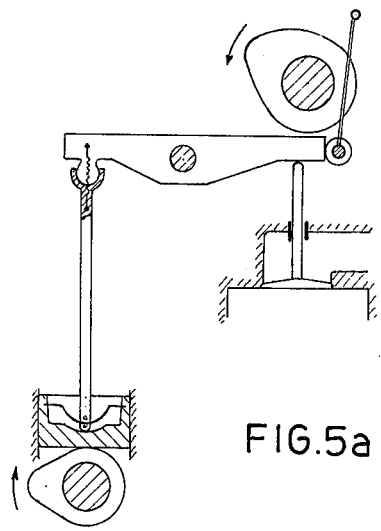
FIGS. 5a-5c illustrate the control of the intake valve under low load conditions.
Figure 4B:
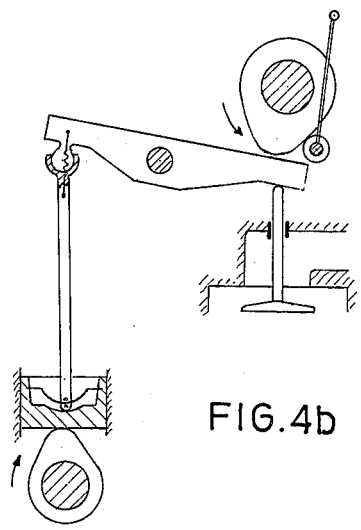
Figure 5B:
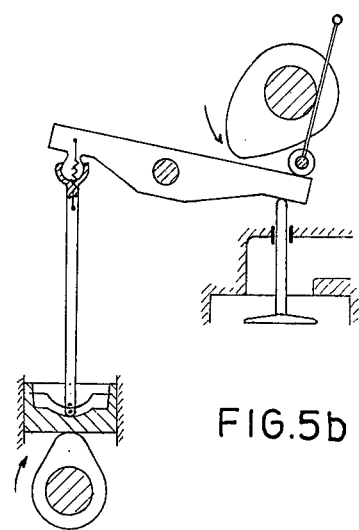
Figure 4C:
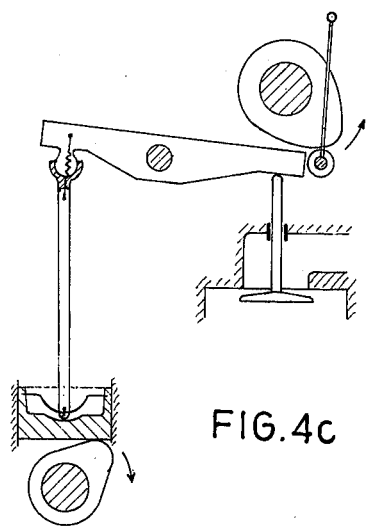
Figure 5C:
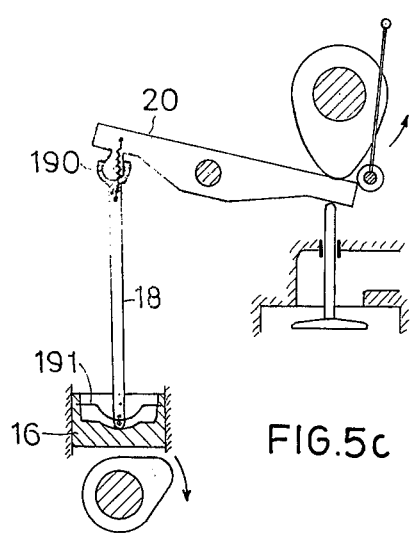

The engine illustrated, insofar as described above, operates in the following manner, reference being made particular to FIGS. 4a–4c illustrating the operation under high load conditions, and to FIGS. 5a–5c illustrating the operation under low load conditions.

Under high-load conditions, (FIGS. 4a–4c), the accelerator pedal 62 will have been depressed a substantial amount thereby rotating worm 60 and moving gears 54 of driven gear 56 with respect to driving gear 52 coupled via the chain-and-sprocket elements 48, 46, 44 to the main cam shaft 14. The phase of the auxiliary cam shaft 32, relative to the main cam shaft 14 is such that the closing of the intake valve 8, as well as the opening thereof, is controlled solely by cam 12 on main cam shaft 14.

Thus, FIG. 4a illustrates the position of the parts before the beginning of the induction stroke wherein the intake valve 8 is still closed. It will be seen that in this position of the parts, the low surface of auxiliary cam 34 is in clearance with the rocker arm 20, and also the stop roller 86 is spring-urged against the end of the rocker arm, so that neither of these members is effective to influence the opening of intake valve 8.

FIG. 4b illustrates the position of the parts just before the complete opening of the intake valve by the main cam 12. It will be seen that the high point of the auxiliary cam 34 has just reached a vertical position to rocker arm 20 but does not engage it, while cam 12 has not yet reached the vertical position with respect to the contacting face of follower 16.

Towards the end of the induction stroke, as shown in FIG. 4c, the intake valve is permitted to close by main cam 12, and neither the auxiliary cam 34 nor the stop roller 86 influences the closing of the intake valve, since the high point of the auxiliary cam 34 has just passed the rocker arm and has kept the stop roller 86 out of engagement with the upper surface of the rocker arm.

Accordingly, it will be seen under the high-load conditions as illustrated in FIGS. 4a–4c, neither the auxiliary cam 34 nor the stop roller 86 is effective to influence the closing of the intake valve under the control of the main cam 12, so that the intake valve closes at the beginning of the normal compression stroke as in a conventional Otto-cycle engine.

The operation under low-load conditions is illustrated in FIGS. 5a–5c. Under low-load conditions, the position of accelerator pedal 62 is such that worm 60 has been rotated so as to retard the phase of gear 56 with respect to gear 52, and thereby to retard the auxiliary cam shaft 32 and its cam 34, with respect to the main cam shaft 14 and its cam 12.

Thus, as shown in FIG. 5a, the position of auxiliary cam 34 is shifted rearwardly, or retarded, with respect to that of main cam 12 for the same position of the latter as in FIG. 4a. In FIG. 5b, the main cam 12 is vertical to follower 16 and has opened the intake valve 8 completely, but the high point on the auxiliary cam 34 has not yet come into alignment with rocker arm 20. Accordingly, as the rocker arm is pivoted by the main cam 12, stop roller 86, under the influence of its spring 88, moves to engage the upper surface of the rocker arm 20, while lever 82 moves to engage and to be stopped by auxiliary shaft 32 and thereby to hold the intake valve in its open position even when it would otherwise be permitted to move to its closed position by the low point on main cam 12. Stop roller 86 holds the intake valve in its open position until the high point on the auxiliary cam 34 engages the stop roller 86, at which time cam 34 holds the intake valve in its open position (FIG. 5c) and permits it to close during the continued rotation of the cam.

It will thus be seen that the auxiliary cam 34, together with the stop roller 86, is effective to retard the closing of the intake valve according to the engine load, namely according to the amount of depression of the accelerator pedal 62; the lower the engine load, the more retarded will be the closing of the intake valve. Thus, some of the fuel-air mixture within the combustion chamber will be pumped back into the intake manifold at the beginning of the compression stroke, until the intake valve is actually closed, thereby decreasing the fuel-air charge, and the power produced by the engine.

Springs 190 and 191 are used to prevent the disengagement between follower 16, push rod 18, and rocker arm 20 in the retarded case as illustrated in FIG. 5c.

Figure 6:
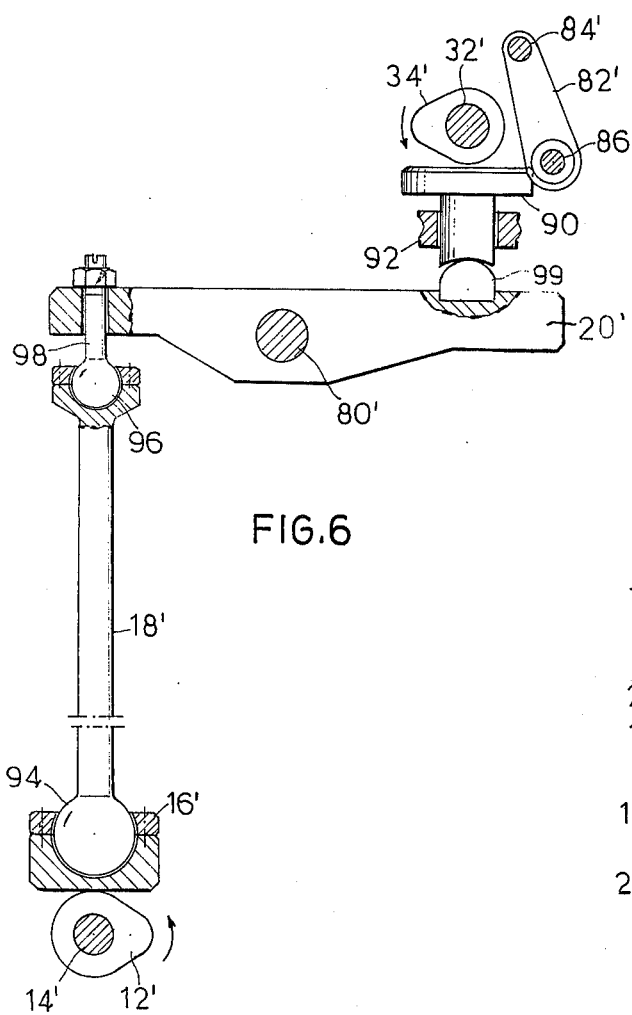
FIG. 6 illustrates a variation in the arrangement for controlling the intake valve which variation enables the use of similar main and auxiliary cam shafts.

FIG. 6 illustrates a variation, wherein the auxiliary cam 34' on the auxiliary cam shaft 32', instead of directly engaging the rocker arm 20', an interposer 90 which in turn engages the end of rocker arm 20', the interposer being mounted for guided axial movement by means of a guide plate 92 parallel to that of the push rod 18'. Also, the push rod is coupled to the follower 16' and to the rocker arm 20' by ball-and-socket joints 94 and 96, respectively. The ball part of joint 96 is carried by a pin 98 fixed to one end of the rocker arm 20', and the interposer 90 engages an embossment 99 carried at the opposite end of the rocker arm, the distance between the center of pin 98 to the rocker arm pivot 80' being equal to the distance between the center of interposer 90 to the rocker arm pivot 80'.

An advantage of the variation illustrated in FIG. 6 is that it enables the cam 34' on the auxiliary cam shaft 32' to be designed substantially with the same configuration as the cam 12' on the main cam shaft 14', although of course the phase of the auxiliary cam 34' is shifted with respect to that of the main cam 12' as described above. Also the use of ball and socket joints 94 and 96 obviate the need of springs 190 and 191.

Figure 3:
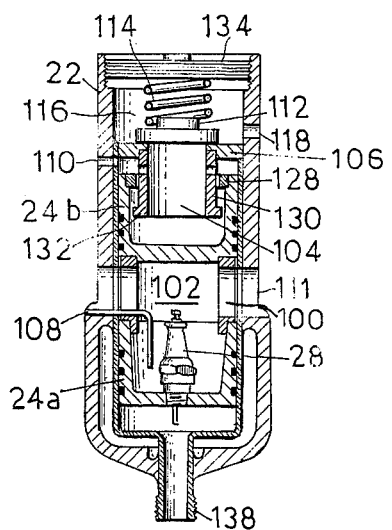
FIG. 3 illustrates more details of the auxiliary piston and cylinder in the engine of FIG. 1.

As mentioned earlier, and shown in FIG. 3 and FIG. 2, the auxiliary piston 24 within the auxiliary cylinder 22 is made of two sections, namely a first section 24a at the front end of the cylinder and defining a wall of the common chamber 26 between the main cylinder 3 and the auxiliary cylinder 22, and a second section 24b spaced rearwardly in cylinder 22 from the first section 24a and rigidly attached to the first section 24a by means of a plurality of rods 100 connected between the two and spaced around their peripheries. Piston section 24a thus defines a compartment 102 between it and piston section 24b; and piston section 24b defines a compartment 104 between it and an apertured plate 106 defining the rear wall of the auxiliary cylinder 22.

Oil is circulated within compartment 102 via an inlet pipe 108 directed to the bottom of piston 24a and an outlet 111, this oil being provided for cooling and lubricating purposes. Oil is also introduced into compartment 104 via an inlet 110, but can leave that compartment only when the pressure within compartment 104 reaches a maximum level, this being effected by providing a spring-urged pressure-relief valve 112 closing the aperture in end wall 106 of the auxiliary cylinder. Thus, when the pressure within compartment 104 reaches a predetermined maximum, as determined by spring 114 acting against valve 112, the latter opens to permit the oil to flow out of compartment 104 to another compartment 116 and then through outlet opening 118.

The oil supplied to compartments 102 and 104 of the auxiliary piston 24 within the auxiliary cylinder 22 is derived from a reservoir 120 (FIG. 1) having a feed conduit 122 connected directly to inlet pipe 108 of compartment 102, and via a one way valve 124 to inlet 110 of compartment 104, the outlet 111 and 118 from these compartments being connected to a return conduit 126 back to the oil reservoir 120.

The upper piston section 24b includes an externally threaded nut 128 threaded into the internal surface of the piston section. In addition, a sleeve 130 formed with a lower out-turned rim 132 is fixed to the apertured end plate 106 which, as mentioned earlier, is fixed to the auxiliary cylinder wall 22. The purpose of these elements is to limit the lowermost position of the auxiliary piston, since ring 128 is positioned such as to engage the out-turned rim 132 of sleeve 130 before the front piston section 24a can bottom against the end of the auxiliary cylinder 22.

As mentioned earlier, the oil supplied to compartment 102 is provided only for cooling and lubricating purposes. However, the oil supplied to compartment 104 is provided for moving the auxiliary piston 24 within its auxiliary cylinder 22 such as to maintain a substantially constant compression ratio in the common combustion chamber 26 under all load conditions.

Figure 7A:
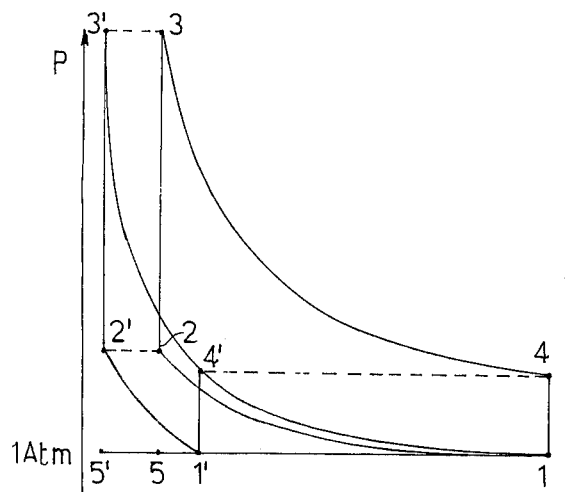
FIGS. 7a-7b are diagrams illustrating the operation of Otto and Otto-Atkinson engines during unthrottled and throttled engine conditions, respectively.

When the engine is shifting from a low load to a high load condition, during the first few cycles, the amount of the fuel-air mixture within the combustion chamber at the time of combustion will increase because of a reduction in the retardation of the closing of the intake valve, which will increase the pressure within the combustion chamber at the beginning of the expansion stroke. Pressure-relief valve 112 is fixed to open at a predetermined high pressure. This high pressure is slightly above the pressure at the beginning of the expansion stroke which is the same under steady state for high and low load conditions as shown in FIG. 7a, by points 3 and 3' respectively. This will cause relief valve 112 to open to release the pressure within compartment 104, and thereby to permit the auxiliary piston to go to a higher position within its auxiliary cylinder until the pressure within compartment 104 is slightly less than the predetermined fixed point at which the relief valve was preset to open. Now, when the engine shifts from a high load to a low load condition, the pressure within the combustion chamber for the first few cycles at the beginning of the expansion stroke will be lowered; thus the oil pressure within compartment 104 from line 110 tends to move the auxiliary piston downwardly within its auxiliary cylinder while the relief valve 112 will remain closed. Thus the volume of the combustion chamber is reduced, whereby the pressure at the beginning of the expansion stroke will be increased to substantially the same pressure as for steady state conditions in the high load case. Since the pressure in the intake manifold is substantially atmospheric under both high and low load conditions, and since the relief valve arrangement 112 maintains a substantially constant pressure at the beginning of the expansion stroke, the pressure at the end of the compression stroke will also be the same under both high and low load conditions. The above-described floating piston arrangement thus maintains a substantially constant compression ratio for all load conditions.

Relief valve 112 could be used also for anti-pollution purposes. Thus, if it is desired to reduce pollution, the valve may be preset to provide a lower pressure within compartment 104, which will decrease the pressure at the beginning of the expansion stroke and thereby decrease the compression ratio in the engine. For example, end plate 134 may be threaded into or out of the cylinder by the operator (via a connection shown schematically by broken line 135) by means of a manipulatable control device (also shown schematically by box 136) within the driver's compartment enabling the operator to thread plate 134 in or out of cylinder 22 and thereby to increase or decrease the preset pressure of opening of relief valve 112, such that during urban driving the valve is preset to open at a lower pressure for anti-pollution purposes, and during rural driving it is preset to open at a higher pressure.

While the above floating-piston arrangement has been described as maintaining a substantially constant compression ratio under all load conditions, it will be appreciated that under very low load conditions ring 128 carried by piston section 24b will limit against the out-turned rim 132 of sleeve 130 fixed to the cylinder, preventing the piston from bottoming against the cylinder. Accordingly, under very low load conditions, the piston may not be able to move downwardly all the way, causing a reduction in the volume of the common combustion chamber which will result in a reduction in the compression ratio. Thus, the expression a substantially constant compression ratio is intended to include this lowering of the compression ratio under low load conditions.

Spark plug 28 is mounted on the front section 24a of the auxiliary piston with its spark gap disposed in the common combustion chamber 26. Thus, the complete auxiliary cylinder assembly 22 may be mounted, via a threaded coupling 138 in the normal opening provided within the engine head for the spark plug (although that opening may have to be enlarged), thereby further simplifying the redesign of the conventional engine head in order to accommodate the auxiliary cylinder and piston arrangement described above.

As known in the conventional Otto engine, the closing of the intake valve may be fixed a predetermined amount (which is the same for both high and low load conditions) in order to take advantage of the ram-effect at high speeds and high loads. The engine of the present invention may also take advantage of the ram-effect by changing the delay in the closing of the intake valve according to the speed and load, of the engine so that a delay is effected even under high loads, especially when the engine is operating at high speeds.

The carburetor is illustrated at 200 in FIG. 1. Preferably it is of a convention SU type, or a CD (constant depression) type, both well known. In this particular application, however, its use provides a number of advantages.

One advantage is that the carburetor can be used equally for both heavy loads and light loads, whereas in conventional systems a special arrangement is provided for light loads operated by the vacuum in the manifold. In the engine of the present invention, however, no signficant vacuum is produced since the manifold operates close to atmospheric pressure. Therefore, the foregoing type of carburetor can be used for light loads without significant changes because it does not require a vacuum.

In addition, when using the illustrated carburetor in the engine of the present invention, under light loads a higher manifold pressure is produced because of the pumping-back of some of the fuel-mixture into the intake manifold as a result of retarding the closing of the intake valve. This slightly higher pressure (but still below atmospheric pressure) under light loads is applied via vent "a," causing the piston 202 in the carburetor to move downwardly, thereby reducing the effective area of the manifold, and the possibility of expelling the fuel-air mixture during low load conditions. Under high loads there is no reverse flow in the intake manifold; therefore the pressure in the manifold will be reduced. This lower pressure causes the carburetor piston 202 to move upwardly, and the amount of air fuel mixture passing through the carburetor is therefore increased.

Because this type of carburetor is well known, its construction and operation are not further described.

In the conventional engine there is no mechanical connection between the brake pedal and the throttle. In the novel engine illustrated in the drawings, however, there is a mechanical connection between the brake pedal and the throttle such that when the brakes are applied, the throttle is closed, thereby reducing the quantity of fuel-air mixture applied to the engine. This is because in the conventional engine closing the throttle causes pumping losses which increases the engine braking, whereas in the engine of the present invention, when the throttle is open there are no substantially pumping losses as the pressure in the manifold is approximately at atmospheric pressure. Accordingly, the novel engine of the present invention includes a mechanical connection, as shown schematically in FIG. 1 by link 252 between brake pedal 250 and throttle 254, effective to close the throttle upon depression of the brake pedal, reducing the quantity of fuel-air mixture and increasing the pumping losses by casing a lower pressure to be produced in the manifold.

Figure 7B:
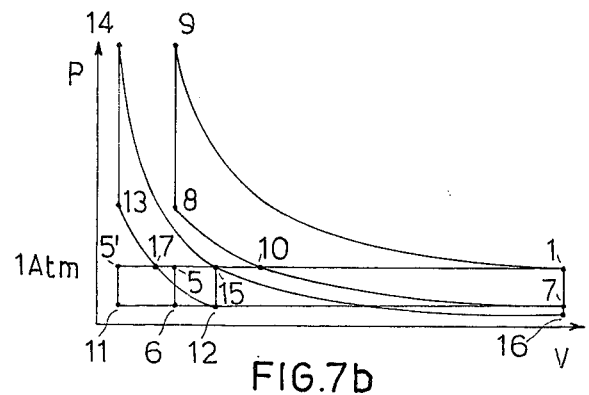

The foregoing will be better understood by reference to the diagrams of FIGS. 7a and 7b. FIG. 7a illustrates the ideal case of the unthrottled condition for the Otto cycle and for the Otto-Atkinson cylce; and FIG. 7b illustrates the throttled condition for the ideal case of both the Otto cycle and the Otto-Atkinson cycle. As shown in FIG. 7a, when the engine operates according to the Otto cycle under full load conditions the process will be 5-1-2-3-4-1-5 for induction, compression, combustion, expansion, exhaust, respectively. When the engine operates under part load conditions according to the unthrottled Otto-Atkinson cycle, the process will be 5'-1-1'-2'-3'-4'-1-5'. There are no pumping losses; therefore, no engine braking. For the throttled Otto and Otto-Atkinson cycles, as shown in FIG. 7b, for a given low pressure in the intake manifold, the pumping losses are shown schematically by the area (5'-11-7-1) − (15-12-7-1) + (15-16-1-15), and the inherent work is shown schematically by the area (17-13-14-15); thus the indicated work is: (17-13-14-15) − (5'-11-12-15) − (15-16-1). The pumping losses in the Otto cycle are shown schematically by the area (5-6-7-1), and the inherent work is shown schematically by the area (1-10-8-9-1); thus the indicated work is: (1-10-8-9-1) − (5-6-7-1). For the same low pressure in the intake manifold, the braking in the Otto-Atkinson cycle is greater than in the Otto cycle because of the lower inherent work and over expansion (points 15-16) of the Otto-Atkinson cycle.

While the invention has been described with respect to a preferred embodiment, it will be appreciated that many variations, modifications and other applications of the invention can be made.

What is claimed is:

1. An internal combustion engine including a cylinder, a piston displaceable therein, a control member movable to control the engine output, means including an intake valve for effecting the induction of a fuel-air mixture into the cylinder, timing means including a main cam shaft having a cam for opening and closing the intake valve, and phase-shifting means including an auxiliary cam shaft having a cam shifting the phase of closing of the intake valve in response to the movement of the control member to thereby control the quantity of fuel-air mixture in the cylinder at the time of combustion.

2. An engine according to claim 1, wherein said phase-shifting means includes means for driving the auxiliary cam shaft at the same angular velocity as the main cam shaft, and means for shifting the phase of the auxiliary cam shaft with respect to the main cam shaft in accordance with the movement of the control member.

3. An engine according to claim 2, wherein said intake valve includes a rocker arm cooperable with said cams on both the main and auxiliary cam shafts, and wherein said phase-shifting means further includes a stop movable between the cam of the auxiliary cam shaft and rocker arm.

4. An engine according to claim 3, wherein said phase-shifting means is effective, when the control member is moved to its low-engine output position, to retard the phase of the auxiliary cam shaft with respect to that of the main cam shaft, such that during low engine loads said stop is moved between the cam on the auxiliary cam shaft and the rocker arm to retard the closing of the intake valve.

5. An engine according to claim 1, further including a rocker arm pivotably mounted at an intermediate point thereof for opening and closing said intake valve, a push rod having one end engagable with one end of the rocker arm on one side of its pivot, the opposite end of the push rod being cooperable with the cam on the main cam shaft, the opposite end of the rocker arm being cooperable with the cam on the auxiliary cam shaft.

6. An engine according to claim 5, wherein said cam on the auxiliary cam shaft directly engages said opposite end of the rocker arm.

7. An engine according to claim 5, wherein said cam on the auxiliary cam shaft engages an interposer which engages said opposite end of the rocker arm, said interposer being mounted for guided axial movement parallel to that of said push rod.

8. An engine according to claim 1, wherein said phase-shifting means comprises a gear transmission including a plurality of gears coupling the auxiliary cam shaft and the main cam shaft to rotate at the same angular velocity, and a further gear coupled to the movable control member to vary the phase of the auxiliary cam shaft with respect to the main cam shaft in response to the position of the movable control member.

9. An engine according to claim 1, wherein said engine includes an ignition device for igniting the fuel-air mixture in the cylinder, and a coupling between said ignition device and said phase-shifting means for also controlling the timing of said ignition device in response to the movement of the control member.

10. An engine according to claim 1, further including an auxiliary cylinder; an auxiliary piston displacable therein; the inner ends of the first mentioned cylinder and of the auxiliary cylinder communicating with each other and defining a common combustion chamber with their respective pistons; means including an intake valve for effecting the induction of a fuel-air mixture into said common combustion chamber; and a spark plug carried by said auxiliary piston for igniting the mixture in said chamber.

11. An engine according to claim 10, wherein said auxiliary piston includes a first section at one end thereof and defining a wall of said common combustion chamber, and a second section mechanically coupled to the first section and defining an expansible and contractable compartment with the opposite end of the auxiliary cylinder, said engine further including means for supplying fluid to said compartment, and a relief valve within said compartment, said relief valve being preset to open at a predetermined high pressure thereby fixing the maximum pressure producible in the combustion chamber during steady-state high and low load conditions, the pressure within the combustion chamber at the beginning of the compression stroke also being substantially atmospheric for high and low load conditions, whereby a substantially constant compression ratio is maintained under all load conditions.

12. An engine according to claim 1, further including a throttle, a brake pedal, and a mechanical connection between the brake pedal and throttle such that depression of the brake pedal closes the throttle, thereby to increase the pumping losses and increase the engine braking.

* * * * *